(12) United States Patent
Sinker et al.

(10) Patent No.: US 6,767,459 B1  
(45) Date of Patent: Jul. 27, 2004

(54) FLUID PROCESSING FOR SEPARATING EMULSIONS

(75) Inventors: Alastair Brenton Sinker, Guildford (GB); Michael James Hess, Nr. Newbury (GB); David Andrew Hadfield, Rudgwick (GB)

(73) Assignee: Cyclotech Limited (GB)

(*) Notice: Subject to any disclaimer, the term of this patent is extended or adjusted under 35 U.S.C. 154(b) by 0 days.

(21) Appl. No.: 09/890,026

(22) PCT Filed: Feb. 1, 2000

(86) PCT No.: PCT/GB00/00291

§ 371 (c)(1),  
(2), (4) Date: Jan. 9, 2002

(87) PCT Pub. No.: WO00/44469

PCT Pub. Date: Aug. 3, 2000

(30) Foreign Application Priority Data

Feb. 1, 1999 (GB) .............................. 9902220

(51) Int. Cl.[7] ............................................ B01D 17/038
(52) U.S. Cl. ................. 210/295; 210/512.1; 210/512.2; 210/DIG. 5
(58) Field of Search .............................. 210/295, 512.1, 210/512.2, 304, 323.1, 508, DIG. 5

(56) References Cited

U.S. PATENT DOCUMENTS 5,616,244 A   4/1997   Seureau et al. .............. 210/295

FOREIGN PATENT DOCUMENTS

EP   0734751   2/1996  
RU   1592282   9/1990

OTHER PUBLICATIONS

International Search Report —PCT/GB00/00291, Jun. 13, 2002.

*Primary Examiner*—David A. Reifsnyder  
(74) *Attorney, Agent, or Firm*—Galgano & Burke LLP

(57) ABSTRACT

Fluid processing apparatus comprising a vessel containing a hydrocyclone and defining an inlet chamber, the vessel having a vessel inlet arranged to feed fluid into the inlet chamber, being arranged to receive fluid from the vessel inlet and to pass the fluid to an inlet of the hydrocyclone. The inlet chamber includes coalescing means arranged to coalesce relatively small droplets contained in the fluid received at the vessel inlet into larger droplets before passing the fluid to the hydrocyclone inlet. The coalescing means having a substantially predetermined external shape which defines at least one elongate liner hole for receiving a respective hydrocyclone liner.

24 Claims, 6 Drawing Sheets

FLUID PROCESSING FOR SEPARATING EMULSIONS

This invention relates to fluid processing apparatus comprising a vessel containing a hydrocyclone.

EP-A-0734751 discloses a cylonic separator having coalescing media placed around the cyclone liners and through which fluid to be separated is forced to flow prior to entering the cyclone liners. In one embodiment the coalescing means is mounted on sleeves which are directly mounted on the cyclone liners. The configuration of the coalescing means and cyclone liners in this sleeved embodiment removal or insertion of the cyclone liners independently of the coalescing means.

According to a first aspect of the invention, there is provided fluid processing apparatus comprising, a vessel containing a hydrocyclone and defining an inlet chamber, the vessel having a vessel inlet arranged to fluid into the inlet chamber, and the inlet chamber being arranged to receive fluid firm the vessel inlet and to pass the fluid to an inlet of the hydrocyclone, the inlet chamber including coalescing means arranged to coalesce relatively small droplets contained in fluid received at the vessel inlet into larger droplets before passing the fluid to the hydrocyclone inlet, the coalescing means having a substantially predetermined external shape which defines at least one elongate liner hole for receiving a respective hydrocyclone liner and which permits removal of the hydrocyclone liner without removing the coalescing means.

By arranging for the coalescing mean to have a substantially predetermined external shape, it is possible to fit the coalescing means to existing fluid processing apparatus. Futhermore by defining at least one elongate liner hole for receiving a respective hydrocyclone liner, the difficulties of the hydrocyclone liner becoming entangled with the coalescing media or causing disruption of the coalescing media when the liner is removed, are avoided. For example, in the preferred embodiment which includes a region of generally parallel fibres which extend generally parallel to the direction of fluid flow, without ensuring that the coalescing media defines an elongate liner hole, it has been found that the parallel fibres restrict entry of the hydrocyclone liners and also become disrupted when hydrocyclone liners are removed because they tend to stick to or snag on the external surface of the liners.

In one embodiment, the substantially predetermined external shape of the coalescing means is produced by the coalescing means including a cage assembly dimensioned to allow it to fit inside the hydrocyclone vessel inlet chamber. Grids may be provided at various points along the cage to allow different stages of coalescing media to be supported. Means may also be provided to segregate the coalescing media from the hydrocyclones to allow passage of the hydrocyclone through the media for ease of installation and removal. The cage assembly may also provide a baffle to divert incoming flow to one end of the hydrocyclone vessel inlet chamber causing a plug flow regime through the media prior to fluid entering the hydrocyclone.

In a second aspect, the invention provides a method of manufacturing fluid processing apparatus having a vessel containing a plurality of hydrocyclones and defining an inlet chamber, the vessel having a vessel inlet arranged to feed fluid into the inlet chamber, and the inlet chamber being arranged to receive fluid from the vessel inlet and to pass the fluid to the respective inlets of the hydrocyclones, comprising the steps of inserting a mass of coalescing media into the inlet chamber, the media having a substantially predetermined external shape defining at least one elongate liner hole for receiving a respective hydrocyclone liners and being arranged to coalesce relatively contained in fluid received at the vessel inlet into larger droplets before passing the fluid to the respect hydocyclone inlets and subsequently inserting at least one hydrocyclone liner into a respective liner hole.

In a third aspect, the invention provides a method of manufacturing fluid processing apparatus having a vessel containing a plurality of hydrocyclones and defining an inlet chamber, the vessel having a vessel inlet arranged to feed fluid into the inlet chamber, and the inlet chamber being arranged to receive fluid from the vessel inlet and to pass the fluid to the respective inlets of the hydrocyclones, the inlet chamber including coalescing means arranged to coalesce relatively small droplets contained in fluid received at the vessel inlet into larger drop before passing the fluid to the respective hydrocyclone inlets, comprising the step of locating an inlet arrangement in the inlet chamber, the inlet arrangement having an inlet baffle which divides the inlet chamber into an inner region which contains the hydroyclones and an outer region adjacent the interior surface of the vessel wall the vessel inlet being arranged to feed fluid into the outer region and the inner region containing a mass of fibrous coalescing medium whose fibres are attached at one end and which at least in use, are arranged generally parallel to the flow direction of fluid in the inner region.

Fluid processing apparatus embodying the invention will now be described by way of example with reference to the drawings in which.

Figure 1A:
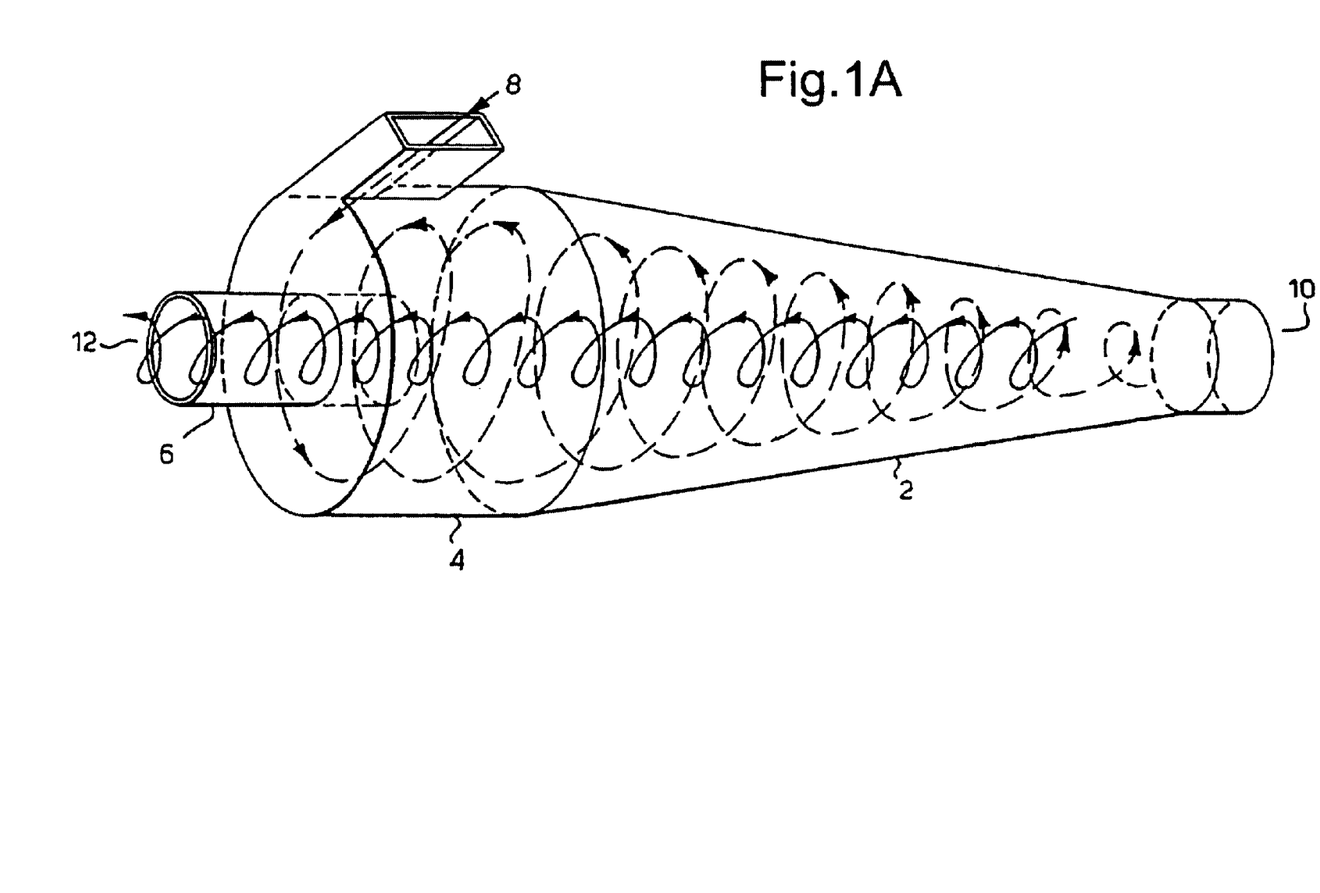
FIG. 1A is a schematic view of a prior art hydrocyclone.

With reference to FIG. 1A, a typical configuration for a hydrocyclone has a conical section 2, a swirl chamber 4, which is generally cylindrical, and a vortex finder 6, which extends into the swirl chamber 4.

In the case of a de-oiling hydrocyclone, oily water is fed tangentially at high velocity into an inlet 8 to the swirl chamber 4 which causes a vortex flow pattern within the hydrocyclone. The vortex creates a high acceleration field of the order of 1000–3000 g which forces the lighter oil droplets to migrate to the central axis of the hydrocyclone. Due to differing axial pressure gradients, the heavier material (the water) flows out through an underflow 10 at the tapered end of the conical section 2 and the oil core flows in the opposite direction and exits the hydrocyclone via the overflow 12.

On a simple level, the separation performance of a hydrocyclone is related to the radial velocity achieved by a drop of a given diameter travelling towards the axial core of the hydrocyclone. Under a given acceleration field within the hydrocyclone, a modified form of Stoke's law describes this radial velocity. The relationship may be defined by the formula $$u_s = \frac{Gg\Delta\rho d^2}{18\mu}$$

where $u_s$ is the radial velocity, Gg is the acceleration field created by the spinning flow, $\Delta\rho$ is the phase density difference between the oil and water, d is the oil droplet diameter and $\mu$ is the continuous phase (water) viscosity. Since an increase in the velocity $u_s$ produces a corresponding increase in the likelihood that the drop will reach the oil core (and therefore be separated) before being carried out with the water in the underflow, it is desirable to increase that velocity.

Having noted that the drop diameter is a squared term in the formula, it is noted that only a small increase in droplet size will provide a large increase in separation performance. It has been found for example that for a typical high efficiency de-oiling hydrocyclone, an increase in drop size entering the inlet 8 from 5 µm to 10 µm increases the separation efficiency from 15% to over 90%.

Figures 2, 3:
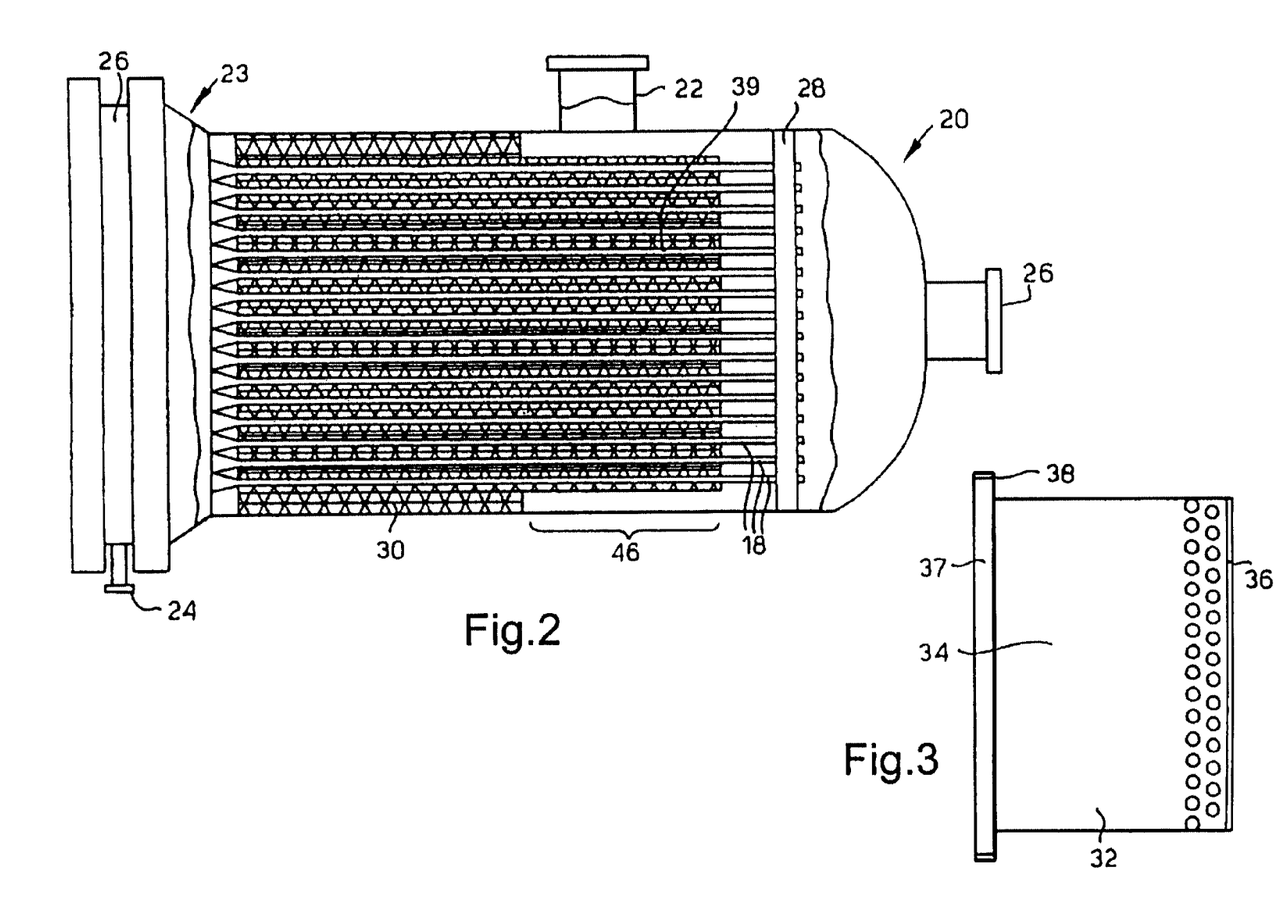
FIG. 2 is a sectional view through a vessel.
FIG. 3 is an elevational view of an inlet arrangement.

With reference to FIG. 2, a plurality of hydrocyclones 18 are fitted within a vessel 20. The vessel has an inlet 22 for oily water, an oil outlet 24 and a water outlet 26.

Figure 1B:
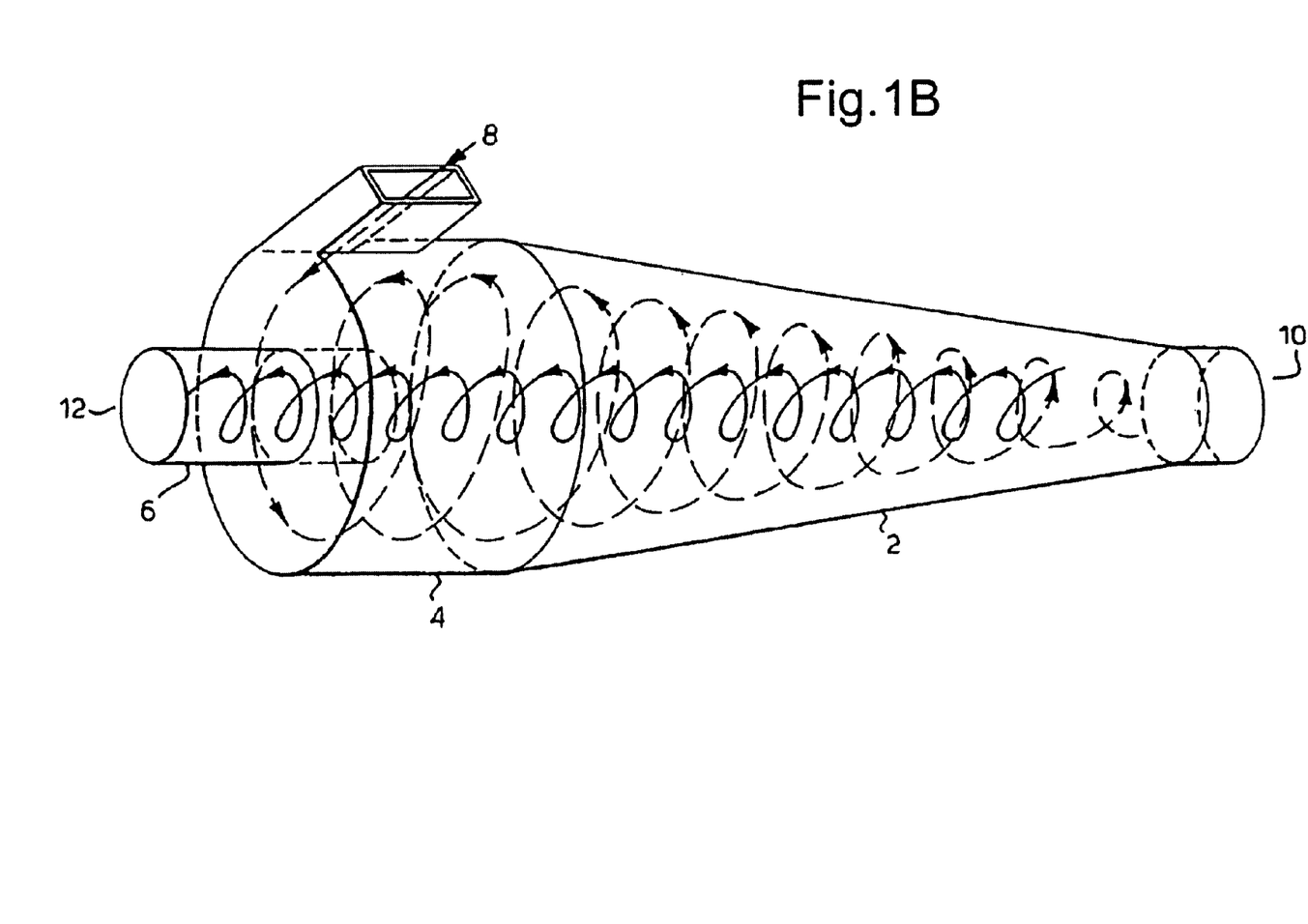
FIG. 1B shows a closed overflow outlet of a hydrocyclone.
Figure 1C:
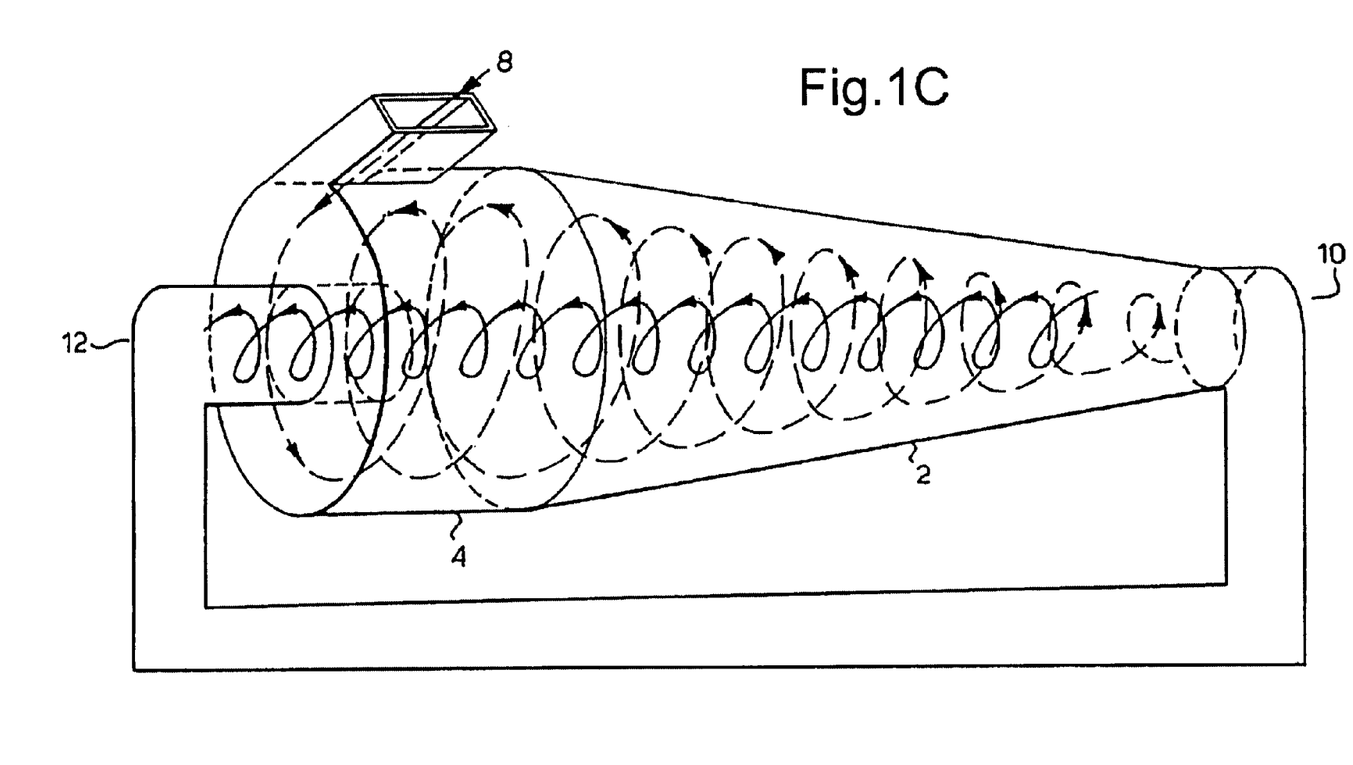
FIG. 1C shows an overflow and underflow outlet of a hydrocyclone coupled together.

The hydrocyclones 18 are fixed in a generally parallel configuration between two hydrocyclone support plates 26,28. The hydrocyclone support plates 26,28 are generally planar with holes to receive hydrocyclone liners of the general configuration shown in FIG. 1. The left-hand support plate 26 receives the overflow 12 and the right-hand support plate 28 receives the underflow 10. The overflow and underflow respectively are sealed to the support plates 26,28 and thus the vessel 20 is divided into three chambers; an oil outlet chamber to the left of the support plate 26, a water outlet chamber to the right of the support plate 28 and an inlet chamber between the plates 26 and 28. Other vessel configurations are used. For other configurations, the general principle of passing the fluid through a coalescing medium in the inlet chamber should be followed.

The inlet 22 feeds oily water into the inlet chamber which exits the inlet chamber via the plurality of hydrocyclone inlets 8. These are located generally in the region marked 23 in FIG. 2.

The hydrocyclone liners are surrounded by a fibre-based coalescing structure 30. The coalescing structure is described in more detail below but, put briefly, this has the function of enlarging the droplet size to improve separation performance as described above.

An inlet device 32 having a so-called "top hat" configuration is shown separately in FIG. 3. The inlet device has a baffle 34 of smaller diameter than the internal diameter of the vessel 20. The inlet device is arranged to be located within the inlet chamber just to the left of the hydrocyclone support plate 28. The inlet device 32 is sealed against the hydrocyclone support plate 28 by a sealing ring 36. It is fixed to the support plate 28 by bolts passing through the support plate and the inlet device. At the left end of the inlet device 32 (as shown in the Figure) an enlarged diameter portion is formed which has a diameter just less than the internal diameter of the vessel 20. Thus, a second sealing ring 38 may be used to seal the inlet device 32 against the internal surface of the vessel 20.

The inlet device 32 is inserted within the inlet chamber generally in the region 39 as shown in FIG. 2.

Figure 4:
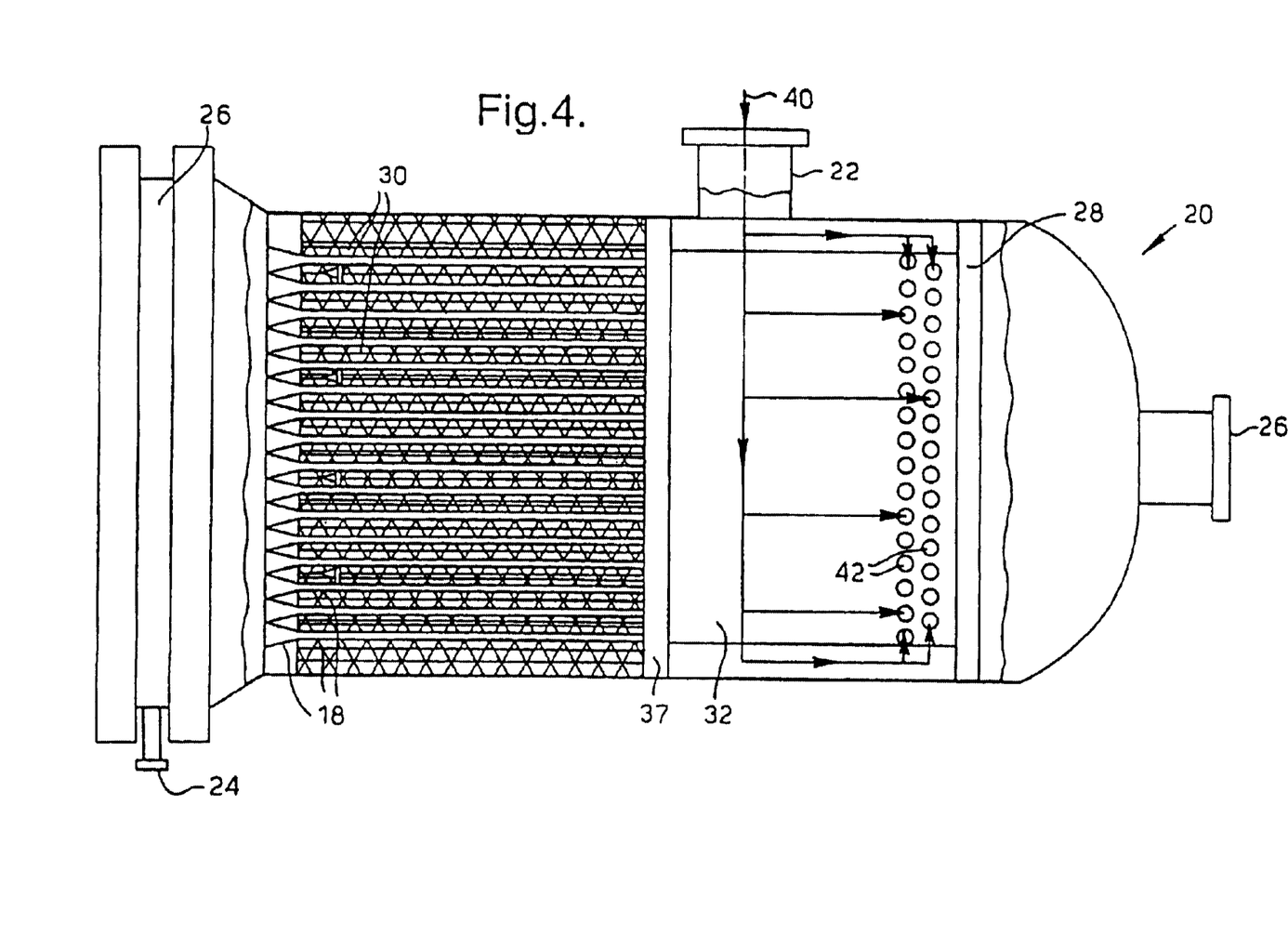
FIG. 4 is a partial section through the inlet arrangement of FIG. 3 assembled to the vessel of FIG. 2.

With reference to FIG. 4, the flow of oily water through the inlet device 32 is shown generally by arrows 40. It will be seen that the baffle 34 defines a generally concentric outer region with the generally cylindrical wall of the vessel 20. Apertures 42 are formed in the baffle 34 at the right side of the inlet device 32 adjacent the cyclone support plate 28. Thus, fluid flowing into the inlet 22 is guided along the outer region generally to the right in FIG. 4 and then through the apertures 42. The apertures 42 generate a radially inward flow into the right side of the fibre-based coalescing structure 30. This arrangement creates a so-called "plug flow" flow regime.

It will be appreciated that before the fluid which has passed through the apertures 42, can enter the cyclones 18, it must travel practically the full length of the inlet chamber. In doing so, it is caused to pass through the coalescing structure 30. This coalescing structure is arranged to increase the droplet size of the oil in the oily water thereby to improve separation efficiency of the hydrocyclones 18.

The choice of the fibre-based coalescing structure is a compromise between high flow rate and good coalescing performance. To achieve good performance, the coalescing structure should consist of fine, high density media where contact time with the media is maximized by limiting flow velocity through the media. However, this type of media is susceptible to solids fouling and would therefore require periodic maintenance by replacement. This type of coalescing structure is used with gravity separators where large droplet sizes are very important. However, as described above, since in the case of a cyclonic separator, the droplet size has an exponential relationship with separation performance, it has been realized that some coalescing performance may be sacrificed (in order to improve throughput) with little impact on the overall hydrocyclone performance. Thus, the present invention uses a coalescing media of relatively low density which is generally not affected by solids fouling problems. Furthermore, the inlet device 32 is arranged to minimize "short circuit" flows and to ensure that fluid flows through most if not all of the coalescing structure 30, thereby maximizing the flow residence time through the coalescing fibre media.

The fibres in the coalescing structure 30 are preferably relatively small. This enhances the entrapment efficiency of the fibres which in turn allows a lower residence time in the inlet chamber to achieve sufficient droplet size and this in turn, allows a greater flow velocity through the coalescing material and therefore through the vessel as a whole.

However, prior art designs have used fibres which extend radially from a central point. Fibres of sufficiently small diameter to provide good entrapment have insufficient strength to withstand the drag force imparted by the fluid flow in the prior art arrangement and also become clogged where the fibres are close together.

Additionally, the fibre density (i.e. the ratio of the volume of fibres per unit volume) has been found to be an important factor in coalescence performance.

Thus the coalescing structure 30 preferably has a fibre construction which incorporates one or more different coalescing media which may have differing fibre density, fibre diameter and fibre surface chemistry wetting properties which vary across the axial length of the precoalescer formed by the coalescing structure 30 in the inlet chamber. The fibres of the coalescing structure 30 may be surface treated to vary the wettability of the fibres. This may be used to adjust the coalescing performance.

As an example, a suitable construction for the coalescing structure 30 has three stages of coalescing media.

Ideally, for efficient droplet capture, the fibre diameter should be of a similar diameter to the diameter of the droplets of interest. Preferably also, the fibres are hydrophobic.

Since the efficiency of a hydrocyclone tends to fall away as the inlet drop size distribution falls below a particular threshold which depends on the hydrocyclone geometry, the physical properties of the phases involved and the operating conditions, the first stage fibre diameter is selected to be approximately equal to that drop size distribution. However, as described above, fibres of this diameter are not structurally robust and thus it has proved difficult to develop a medium which has small diameter fibres but also has a sufficiently high porosity to ensure that it is not susceptible to solids fouling. This problem has been overcome by using a "tow" which is constructed from fine fibres having a similar diameter to the dispersion droplets and which are grouped in the same direction as the fluid flow. This medium is typically attached at one end only near the support plate 28. As fluid flows through the apertures 42 and back towards the hydrocyclone inlets 8, the fibres align themselves generally parallel with the flow direction. This arrangement exhibits a low pressure drop and insensitivity to solids fouling but a high droplet capture efficiency. Furthermore, the fibres are strong in tension and therefore have a long service life. Typical materials for the fibres are stainless steel, glass fibre, polypropylene or polyester. A typical diameter would be in the range of 5 $\mu$m to 20 $\mu$m.

Preferably, the fibres are attached to a grid which is fixed to the inlet device in its inner region generally adjacent the apertures 42. Thus the inlet device and the first stage of the coalescing structure may be inserted into the vessel 20 as a complete pre-assembled unit. In this case, the first stage of the coalescing structure 30 would form the portion marked 46 in FIG. 2.

The tow may be attached at both ends. The attachment points in this case, would be arranged to cause the fibres to be aligned generally with the direction of flow through the coalescing medium at that point. It may instead be advantageous to align the fibres at a small angle of inclination to the direction of flow. Provided the angle of inclination is not too great, the fibres will be sufficiently strong to withstand the drag forces imparted by the fluid as it passes through the coalescing medium.

As the fluid flows towards the hydrocyclone inlet 8, it passes through a second stage formed from a coarse mesh having a larger fibre diameter than the tow. The larger fibre diameter (typically 20 $\mu$m to 30 $\mu$m) allows the fibre diameter/droplet diameter ratio to be near unity which in turn enhances the coalescing efficiency. The medium may be made from a similar choice of materials to that of the tow.

The third stage, which is located downstream of the second and first stages, may be formed from an open mesh (having a fibre diameter larger than that of the second stage; typically 400 $\mu$m). The open mesh may, for example, be made from polyester, nylon or PTFE.

Preferably, the coalescing structure 30 is formed with pre-formed holes for the insertion of one or more hydrocyclone liners. Thus, a vessel 20 may be assembled by opening the vessel by the removal of the support plate 26, inserting an inlet device 32 (with or without the fine fibre first stage coalescing structure described above already attached), an integrally-formed coalescing structure 30 (which may include the second and third stages described above) may be inserted into the vessel and then the individual hydrocyclone liners may be inserted into the holes in the coalescing structure 30. Finally, the hydrocyclone support plate 26 is fixed to close the vessel. Since these components are modular, they may be readily maintained and furthermore may be fitted retrospectively to existing vessels. It will be appreciated that one coalescing stage may be used or more than one, and the number of stages is not limited to three as described above.

Figure 5:
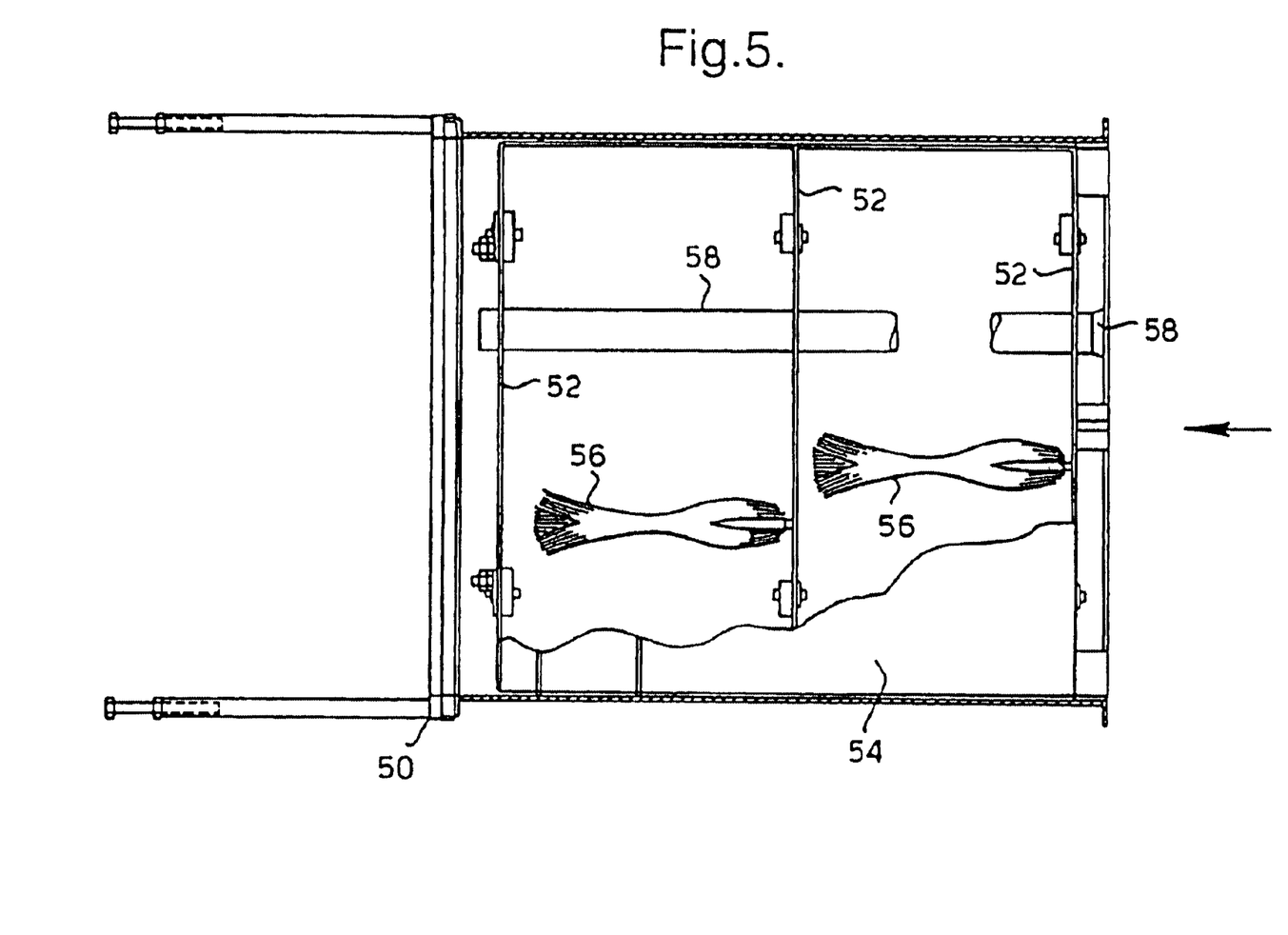
FIG. 5 is a schematic view of a coalescer structure.

With reference to FIG. 5, the coalescing structure 30 is shown separated from the vessel and hydrocyclone liners.

A support frame 50 is used to mount the coalescing structure within a vessel. The means has a media cage 54 which is formed of a plurality of media support grids 52 to which are fixed "parallel" coalescing media 56.

The coalescing means may also include floating tubes 58 which allow easy insertion and removal of hydrocyclone liners.

The vessel may be used to separate oil from water or water from oil or by correct selection of the coalescing media and the hydrocyclone dimensions, other fluids.

It will be understood that a "hydrocyclone liner" means an individual hydrocyclone with the necessary interfaces to allow it to be installed inside a pressure vessel.

What is claim is:

1. Fluid processing apparatus comprising: a vessel containing a hydrocyclone and defining an inlet chamber, the vessel having a vessel inlet arranged to feed fluid into the inlet chamber, and the inlet chamber being arranged to receive fluid from the vessel inlet and to pass the fluid to an inlet of the hydrocyclone, the inlet chamber including coalescing means mechanically supported by the vessel and arranged to coalesce relatively small droplets contained in fluid received at the vessel inlet into larger droplets before passing the fluid to the hydrocyclone inlet, the coalescing means having a substantially predetermined external shape which defines at least one elongate liner hole for receiving a respective hydrocyclone liner and which permits removal of the hydrocyclone liner without removing the coalescing means.

2. Apparatus according to claim 1, wherein the coalescing means is arranged to cause the fluid to pass through fibers of generally increasing. respective cross-sectional areas as the fluid passes towards the hydrocyclone inlet.

3. Apparatus according to claim 1, wherein the coalescing means is arranged to cause the fluid to pass through fibers of predetermined varying wettability as the fluid passes towards the hydrocyclone inlet.

4. Apparatus according to claim 1, wherein the coalescing means is arranged to cause the fluid to pass through fibers and wherein the coalescing means is further arranged to cause the fluid to pass through regions in which the fiber density varies in a predetermined manner as the fluid passes towards the hydrocyclone inlet.

5. Apparatus according to claim 1, wherein the coalescing means includes a region of generally parallel fibers arranged, at least in use, to extend generally parallel to the direction of fluid flow.

6. Apparatus according to claim 5, wherein the parallel fibers are attached generally by one end only of the fibers.

7. Apparatus according to claim 5, wherein the fibers are attached at both ends.

8. Apparatus according to claim 1, wherein the inlet chamber includes an inlet arrangement which creates a plug flow regime at the inlet of the coalescing means.

9. Apparatus according to claim 1, wherein the vessel is generally elongate and the hydrocyclone inlet is positioned generally at a first end of the vessel, the inlet chamber containing an inlet arrangement having an inlet baffle which divides the inlet chamber into an inner region which contains the hydrocyclone and an outer region adjacent a interior surface of the vessel wall, the vessel inlet being arranged to feed fluid into the outer region and the inlet baffle including at least one baffle aperture located generally at a second, distal end of the vessel and arranged to permit fluid flow from the outer region to the inner region.

10. Apparatus according to claim 9, wherein the inner region further contains the coalescing means.

11. Apparatus according to claim 9, wherein the vessel inlet is arranged to feed fluid into the outer region at a position between the two ends of the vessel.

12. Apparatus according to claim 9, wherein the outer region extends along a shorter length of the vessel than the inner region.

13. Apparatus according to claim 9, wherein the inlet baffle is generally cylindrical.

14. Apparatus according to claim 13, wherein each baffle aperture is arranged to cause a generally inwardly radial flow of fluid into the inner region.

15. Apparatus according to claim 9, wherein the parallel fibers extend in the inner region from each baffle aperture towards the first end of the vessel.

16. Apparatus according to claim 1, wherein the coalescing means includes a mass of integrally-formed coalescing media defining a plurality of elongate holes for receiving at least one respective hydrocyclone liner.

17. Apparatus according to claim 1, wherein the fluid is an oil and water emulsion.

18. Apparatus according to claim 1, wherein the overflow outlet of the hydrocyclone is closed.

19. Apparatus according to claim 1, wherein the overflow and underflow outlets of the hydrocyclone are coupled together.

20. Apparatus according to claim 1, wherein the vessel contains a plurality of hydrocyclones.

21. A method of manufacturing a fluid processing apparatus having a vessel containing a plurality of hydrocyclones and defining an inlet chamber, the vessel having a vessel inlet arranged to feed fluid into the inlet chamber, and the inlet chamber being arranged to receive fluid from the vessel inlet and to pass the fluid to the respective inlets of the hydrocyclones, comprising the steps of: inserting a mass of coalescing media into the inlet chamber, the media having a substantially pre-determined external shape defining at least one elongate liner hole for receiving each respective hydrocyclone liner, and arranging said coalescing media to coalesce relatively small droplets contained in fluid received at the vessel inlet into larger droplets before passing the fluid to each respective hydrocyclone inlet, subsequently inserting at least one hydrocyclone liner into a respective liner hole and mechanically supporting said coalescing media on said vessel.

22. A method according to claim 21, including the step of locating an inlet arrangement in the inlet chamber, the inlet arrangement having an inlet baffle which divides the inlet chamber into an inner region which contains the hydrocyclones and an outer region adjacent an interior surface of a vessel wall, arranging the vessel inlet to feed fluid into the outer region and the inner region containing a mass of fibrous coalescing medium whose fibers are attached at one end of the vessel and arranging said fibers so that they are, at least in use, generally parallel to the flow direction of fluid in the inner region.

23. A method of manufacturing a fluid processing apparatus having a vessel containing a plurality of hydrocyclones and defining an inlet chamber, the vessel having a vessel inlet arranged to feed fluid into the inlet chamber, and the inlet chamber being arranged to receive fluid from the vessel inlet and to pass the fluid to respective inlets of the hydrocyclones, the inlet chamber including coalescing means arranged to coalesce relatively small droplets contained in fluid received at the vessel inlet into larger droplets before passing the fluid to the respective hydrocyclone inlets, comprising the steps of: locating an inlet arrangement in the inlet chamber, the inlet arrangement having an inlet baffle which divides the inlet chamber into an inner region which contains the hydrocyclones and an outer region adjacent the interior surface of the vessel wall, arranging the vessel inlet to feed fluid into the outer region and the inner region, wherein the coalescing means in said inner region contains a mass of fibrous coalescing medium whose fibers are attached at one end of the vessel and arranging said fibers so that they are, at least in use, generally parallel to the flow direction of fluid in the inner region.

24. A method of manufacturing according to claim 23, additionally including the step of mechanically supporting said coalescing means by said vessel.

* * * * *